(12) United States Patent
Scherr

(10) Patent No.: US 10,135,634 B2
(45) Date of Patent: Nov. 20, 2018

(54) BUS INTERFACE WITH BI-DIRECTIONAL, ONE-WIRE COMMUNICATION AND INDIVIDUAL SELECT LINES

(71) Applicant: Infineon Technologies AG, Neubiberg (DE)

(72) Inventor: Wolfgang Scherr, Villach (AT)

(73) Assignee: Infineon Technologies AG, Neubiberg (DE)

( * ) Notice: Subject to any disclaimer, the term of this patent is extended or adjusted under 35 U.S.C. 154(b) by 50 days.

(21) Appl. No.: 15/343,087

(22) Filed: Nov. 3, 2016

(65) Prior Publication Data

US 2018/0123823 A1    May 3, 2018

(51) Int. Cl.
*H04J 3/00* (2006.01)
*H04L 12/40* (2006.01)

(52) U.S. Cl.
CPC .......... *H04L 12/40019* (2013.01); *H04L 2012/40215* (2013.01)

(58) Field of Classification Search
None
See application file for complete search history.

(56) References Cited

U.S. PATENT DOCUMENTS

| | | | | |
|---|---|---|---|---|
| 5,327,121 A * | 7/1994 | Antles, II | ........... | G06F 13/24 340/3.1 |
| 2004/0208200 A1* | 10/2004 | Hejdeman | ........... | H04L 7/044 370/476 |
| 2005/0114575 A1* | 5/2005 | Weisser | ........... | G06F 3/0605 710/74 |
| 2007/0064360 A1* | 3/2007 | DeBoer | ........... | H02J 13/0062 361/62 |
| 2017/0041127 A1* | 2/2017 | Sharpe-Geisler | ..... | H04L 7/0012 |

OTHER PUBLICATIONS

Wikipedia, "1-Wire," https://en.wikipedia.org/w/index.php?title=1-Wire&oldid=738314467, Sep. 8, 2016, 4 pages.
Wikipedia, "CAN bus," https://en.wikipedia.org/w/index.php?title=CAN_bus&oldid=741413740, Sep. 27, 2016, 16 pages.
Wikipedia, "I²C," https://en.wikipedia.org/wiki/I%C2%B2C, Sep. 28, 2016, 15 pages.
Wikipedia, "Local Interconnect Network," https//en.wikipedia.org/wiki/Local_Interconnect_Network, Sep. 26, 2016, 8 pages.

(Continued)

*Primary Examiner* — Kwang B Yao
*Assistant Examiner* — Juvena Loo
(74) *Attorney, Agent, or Firm* — Harrity & Harrity, LLP

(57) ABSTRACT

A system may include a plurality of slave devices connected to a master device via a bus interface that includes a communication line and a plurality of select lines. The communication line may connect the master device to each of the plurality of slave devices and may permit bi-directional, one-wire communication among the master device and the plurality of slave devices. A select line, of the plurality of select lines, may connect the master device to a slave device, of the plurality of slave devices, and enable signaling, associated with the bi-directional, one-wire communication, between the master device and the slave device.

24 Claims, 10 Drawing Sheets

(56) References Cited

OTHER PUBLICATIONS

PSI5, "Peripheral Sensor Interface for Automotive Applications," http://psi5.org/fileadmin/user_upload/01_psi5.org/04_Specification/Specifications_PDFs/psi5_specification_v13_080729.pdf, Jul. 29, 2008, 47 pages.
Wikipedia, "SENT(protocol)," https://en.wikipedia.org/w/index.php?title=SENT_(protocol)&oldid=700587845, Jan. 19, 2016, 1 page.
Kramolis, "SENT/SPC Driver for the MPC5510 Microcontroller Family," NXP, Freescale Semiconductor, Inc., Document No. AN4219, Rev. 0, Oct. 2010, 27 pages.
Wikipedia, "Serial Peripheral Interface Bus," https://en.wikipedia.org/wiki/Serial_Peripheral_Interface_Bus, Sep. 25, 2016, 14 pages.
Wikipedia, "Synchronous Serial Interface," https://en.wikipedia.org/wiki/Sychronous_Serial_Interface, Sep. 12, 2016, 6 pages.
Wikipedia, "Universal asynchronous receiver/transmitter," https://en.wikipedia.org/wiki/Universal_asynchronous_receiver/transmitter, Sep. 29, 2016, 10 pages.

\* cited by examiner

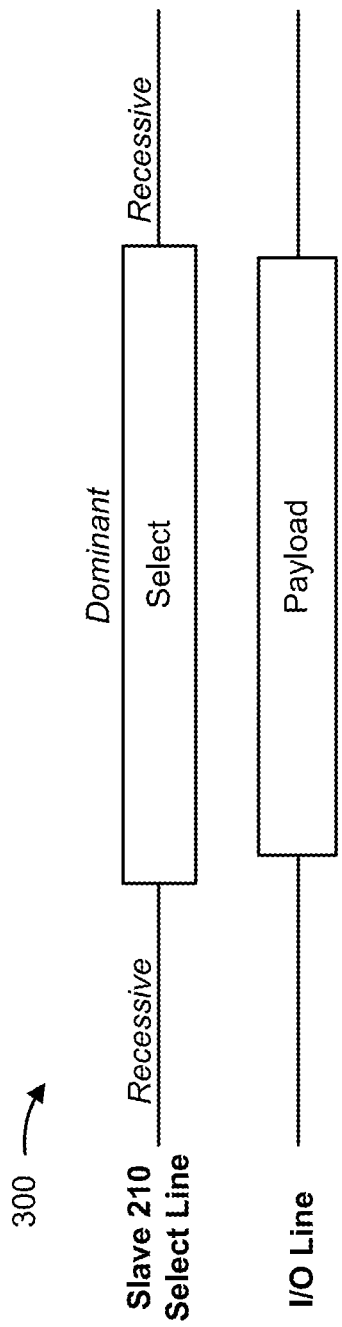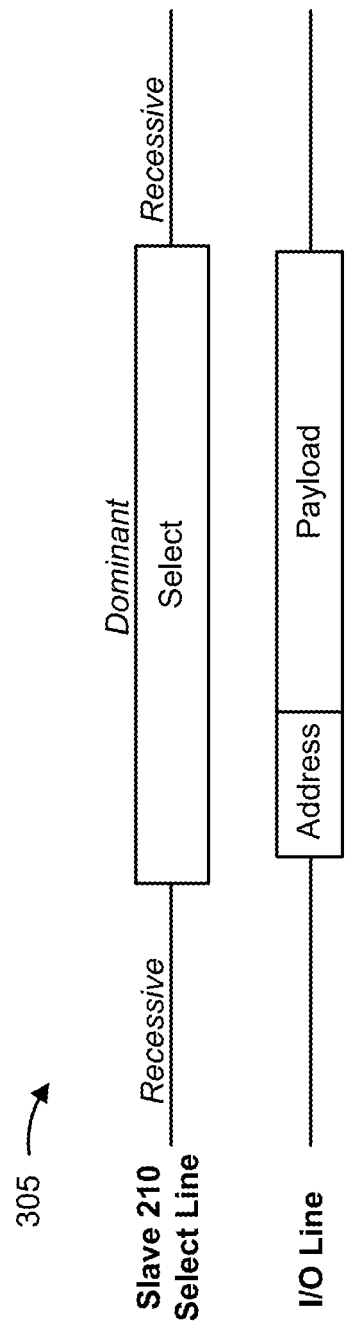

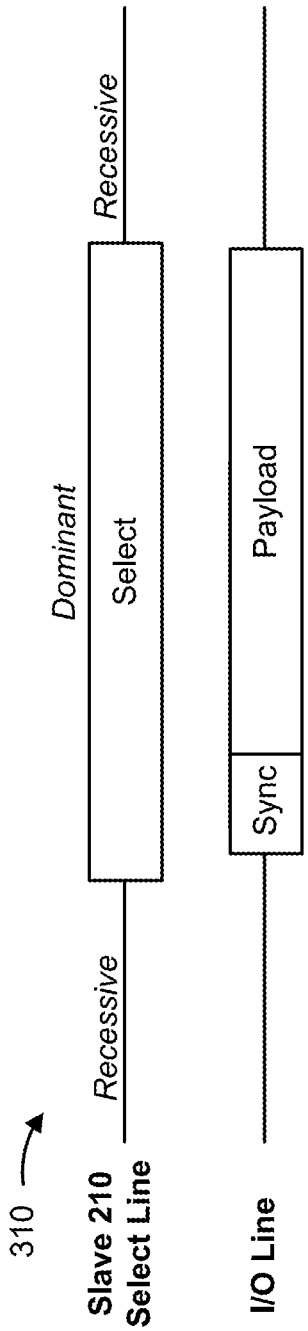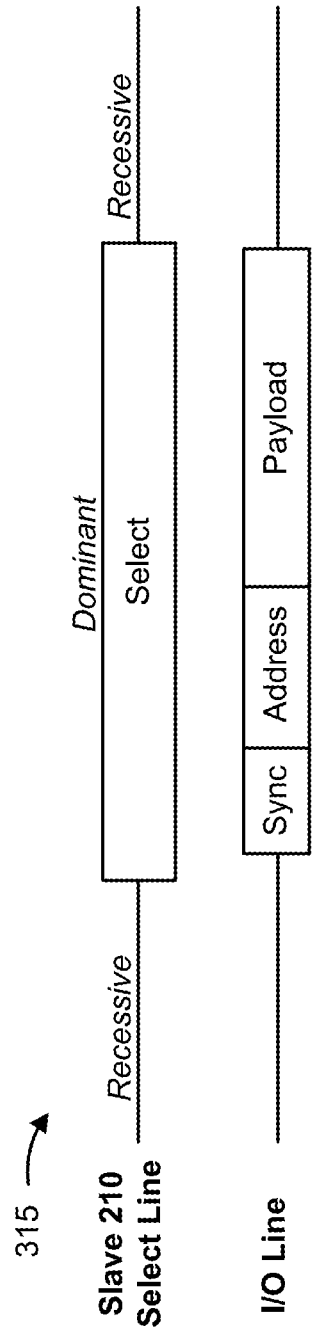

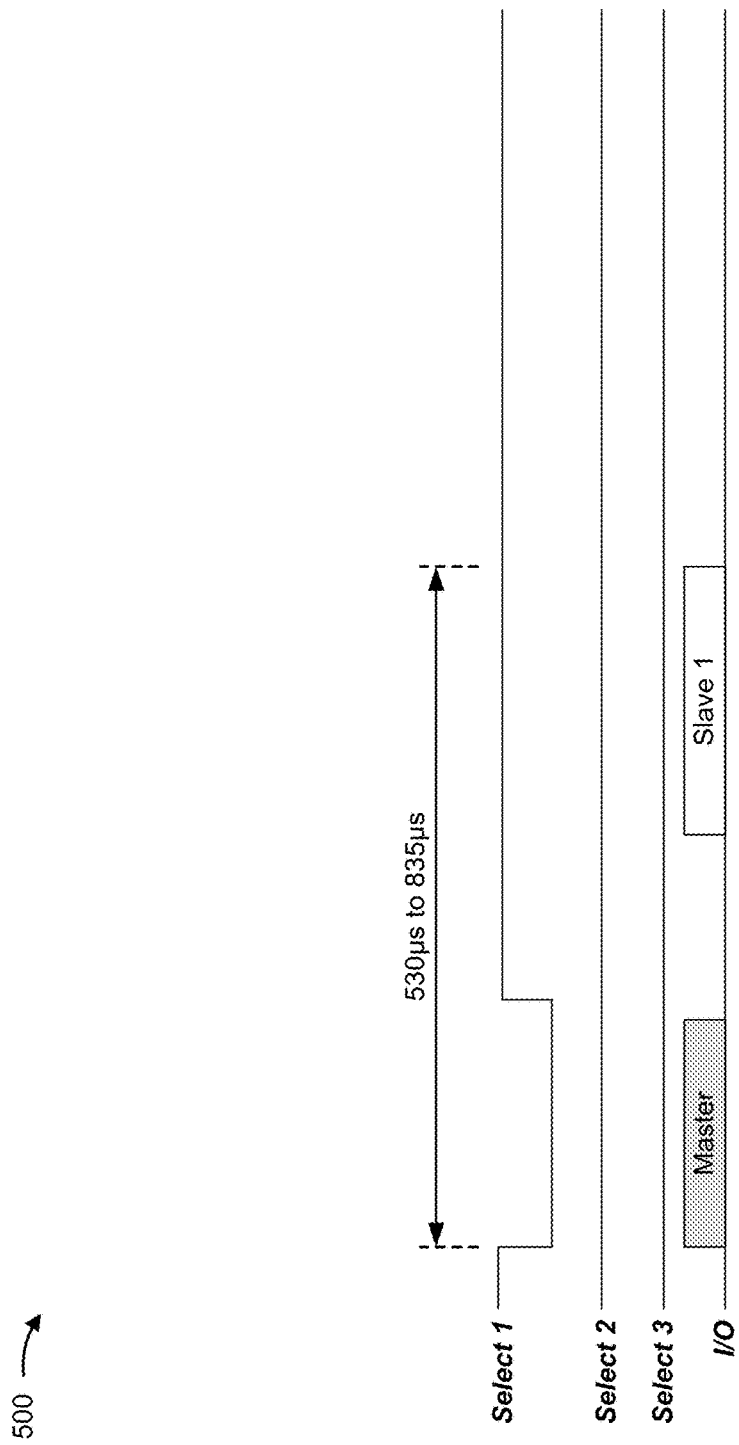

BUS INTERFACE WITH BI-DIRECTIONAL, ONE-WIRE COMMUNICATION AND INDIVIDUAL SELECT LINES

BACKGROUND

A master-slave architecture may include a master device that controls one or more slave devices to which the master device is connected. The master device may include, for example, a controller, a microcontroller, an electronic control unit, or the like. The slave devices may include, for example, sensors (e.g., speed sensors, angle sensors, pressure sensors, etc.), actors (e.g., light emitting diodes (LEDs), light sources, etc.), hybrid sensor/actors, or the like.

SUMMARY

According to some possible implementations, a system may include: a plurality of slave devices connected to a master device via a bus interface that includes a communication line and a plurality of select lines, where the communication line may connect the master device to each of the plurality of slave devices and may permit bi-directional, one-wire communication among the master device and the plurality of slave devices, and where a select line, of the plurality of select lines, may connect the master device to a slave device, of the plurality of slave devices, and may enable signaling, associated with the bi-directional, one-wire communication, between the master device and the slave device.

According to some possible implementations, a system may include a master device to: signal, via a select line associated with a slave device, that the master device is to transmit information via a communication line, where the master device may be connected to the slave device via a bus interface that includes the communication line and the select line, where the communication line may permit bi-directional, one-wire communication between the master device and the slave device, and where the select line may enable signaling by the master device to be detected by the slave device; and transmit, based on signaling via the select line, the information on the communication line; and the slave device to: detect the signaling on the select line; and receive the information, via the communication line, based on detecting the signaling on the select line.

According to some possible implementations, a system may include: a set of slave devices; a master device; a bi-directional, one-wire communication bus connecting the master device and the set of slave devices; and a set of select lines connecting the master device and the set of slave devices, each select line, of the set of select lines, connecting the master device to a respective slave device of the set of slave devices.

BRIEF DESCRIPTION OF THE DRAWINGS

FIGS. 3A-3E are diagrams of example implementations for enabling a master device to communicate with slave devices via a serial companion (SCP) interface;

FIGS. 5A and 5B are diagrams of additional example implementations associated with implementing the SCP interface for communications between a master device and one or more slave devices.

DETAILED DESCRIPTION

Figure 1:
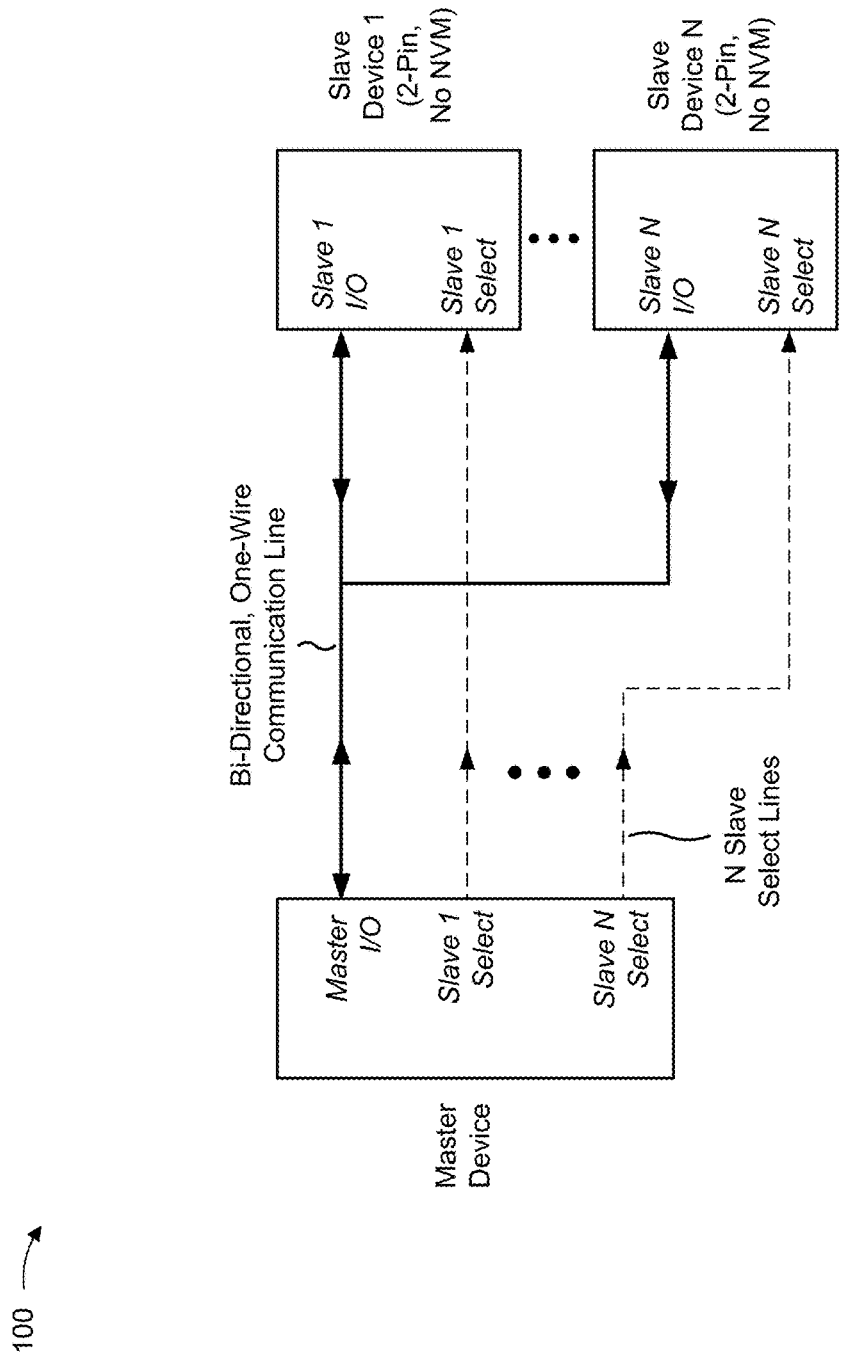
FIG. 1 is a diagram of an overview of an example implementation described herein.

The following detailed description of example implementations refers to the accompanying drawings. The same reference numbers in different drawings may identify the same or similar elements.

A communication interface may enable a master device (e.g., a controller, a microcontroller, an electronic control unit (ECU), or the like) to communicate with a set of slave devices, such as one or more sensing devices (e.g., one or more devices configured to collect and/or gather data, such as a speed sensor, an angle sensor, a pressure sensor, a gas sensor, or the like), one or more actor devices (e.g., one or more devices configured to perform an action, such as an LED, a light source, an audio device, a switch, or the like), one or more hybrid sensor/actor devices (e.g., one or more devices that perform a sensing function and perform an action), or the like.

In some implementations, the communication interface may be in a bus configuration (i.e., a bus interface), such as a Universal Asynchronous Receiver Transmitter (UART)-based interface (e.g., a local interconnect network (LIN) interface), a serial peripheral interface (SPI), an inter-integrated circuit (I2C) interface, a single edge nibble transmission (SENT) interface, a short PWM code (SPC) interface, a controller area network (CAN) interface, a 1-Wire interface, a peripheral sensor interface 5 (PSI5) interface, or the like.

In some cases, cost considerations may need to be accounted for when selecting a bus interface for implementation of a given master-slave system. For example, as low-cost slave devices (e.g., slave devices including a small number of components for gathering and/or processing data, slave devices without a non-volatile memory (NVM) component, slave devices including fewer than four pins, or the like) become increasingly available, cost efficiencies of these low-cost slave devices may be difficult to realize using such prior bus interfaces as those listed above.

For example, an I2C interface may be used in order to reduce an amount of peripheral hardware needed on a master device and/or to reduce an amount of cabling and/or pins to connect to multiple slave devices. However, the I2C interface requires that each slave device be individually identifiable (e.g., by an address configurable via a pin of the slave device, by an address stored on the slave device during manufacturing), which may significantly increase a cost of the system by requiring the otherwise low-cost slave devices to have an additional pin (e.g., to accommodate configuration of the address) or include a NVM component (e.g., to store the address during manufacturing).

As another example, use of a SPI interface, with individual select lines for each slave device, may significantly increase a cost of the system by requiring the otherwise low-cost slave devices to include additional pins (e.g., four or more) in order to support SPI interface communications and slave device address configuration.

As yet another example, use of a PSI5 interface may significantly increase a cost of the system by requiring an accurate clock base in order to coordinate communications via the interface, which may require the otherwise low-cost slave devices to maintain accurate clocks (e.g., using oscillators with a guaranteed accuracy of up to 1%) in order to coordinate communication within the system, which are more costly than relatively inaccurate clocks (e.g., using oscillators capable of maintaining a clock with a guaranteed accuracy of up to 20%).

As still another example, a PSI5 interface or a CAN interface may require the system to draw a significant amount of current (e.g., 20 to 30 milliamps (mA)) and/or consume a significant amount of power (e.g., which increases the overall cost of the system and/or reduces system efficiency).

As another example, a LIN interface or a CAN interface may not support direct communication of the slave devices with the master device (e.g., a transceiver may be needed to perform signal level conversion), which increases the cost and/or complexity of the system.

As a more general example, prior bus interfaces may not provide simple methods for simultaneously triggering multiple slave devices on the bus, and/or may not be well supported in a given application (e.g., I2C is not widely available in automotive applications).

Implementations described herein provide a bus interface with a bi-directional, one-wire communication line between a master device and a set of slave devices, with an individual select line for each slave device. This bus interface may be referred to as a serial companion (SCP) interface.

In some implementations, the SCP interface allows efficiencies of low-cost slave devices to be realized by, for example, supporting operation of slave devices that include only two pins, supporting operation of slave devices that do not include a NVM component, operating the slave devices with low power consumption and/or current draw, providing for direct communication between the slave devices and the master device, supporting operation of the slave devices based on a relatively inaccurate clock (e.g., an oscillator with a guaranteed accuracy of up to 20%), or the like.

In some implementations, the SCP interface may support operation with a 3.3 volt (V) or 5.0V supply and/or signal level. In some implementations, the SCP interface may be used to power a slave device in the master-slave system (e.g., via the bi-directional, one-wire communication line and/or a select line associated with a slave device), which may reduce a number of pins needed on the one or more slave devices.

Additionally, or alternatively, the SCP interface may support communication between a master device and a slave device at a bit rate in a range from 100 kilobits per second (kBit/s) (e.g., when the master device and the slave device are connected via a wired connection) to 1 megabit per second (MBit/s) (e.g., when the master device and the slave device are connected via an on-board connection on a circuit board). Additionally, or alternatively, the SCP interface may support a data integrity check capability associated with detecting an error in information received by the master device and/or the slave device.

FIG. 1 is a diagram of an overview of an example implementation 100 described herein. As shown in FIG. 1, a master-slave system may include a master device and a set of slave devices (e.g., slave device 1 through slave device N) (N≥1). As shown, the master device and the set of slave devices may be connected in a bus configuration that includes a bi-directional, one-wire communication line (sometimes referred to as a bi-directional, one-wire I/O line) and a set of N slave select lines corresponding to the set of N slave devices. As described above, this bus configuration may be referred to as a serial companion (SCP) interface.

In some implementations, the bi-directional, one-wire communication line allows the master device to send information (e.g., synchronization information, address information, configuration information, a payload including a command and/or data, etc.) to each of the set of slave devices (e.g., at a same time, at different times) and/or receive information (e.g., a response to a request, an acknowledgement, information associated with an exception, data, etc.) from each of the set of slave devices, as described in further detail below. As shown in FIG. 1, the bi-directional, one-wire communication line may connect the master device to all of the slave devices.

As further shown in FIG. 1, the master device is also connected to the slave devices via a set of select lines (i.e., a respective select line for each slave device). In some implementations, the select line allows the master device to signal, to the corresponding slave device, that the slave device is to prepare to receive information from and/or transmit information to the master device. For example, the master device may signal, via a transition of a signal on the select line corresponding to a particular slave device, that the particular slave device is to receive and/or transmit information via the bi-directional, one-wire communication line, as described in detail below.

Notably, as illustrated in FIG. 1, the SCP interface supports slave devices that include only two pins (e.g., a pin associated with the bi-directional, one-wire I/O line and a pin associated with the slave select line). As further shown, the SCP interface supports slave devices that do not include a NVM component (or another component associated with an individual slave addressing mechanism) and supports direct communication between the master device and the slave devices. Moreover, the SCP interface supports operation of the slave devices with a low power consumption and/or current draw (e.g., as compared to a prior bus interface, such as a PSI5 interface and/or a CAN interface), and supports operation of the slave devices based on a relatively inaccurate oscillator. As such, the SCP interface allows efficiencies of low-cost slave devices to be realized, thereby reducing cost and/or complexity of the master-slave system.

As indicated above, FIG. 1 is provided merely as an example. Other examples are possible and may differ from what was described with regard to FIG. 1.

Figure 2:
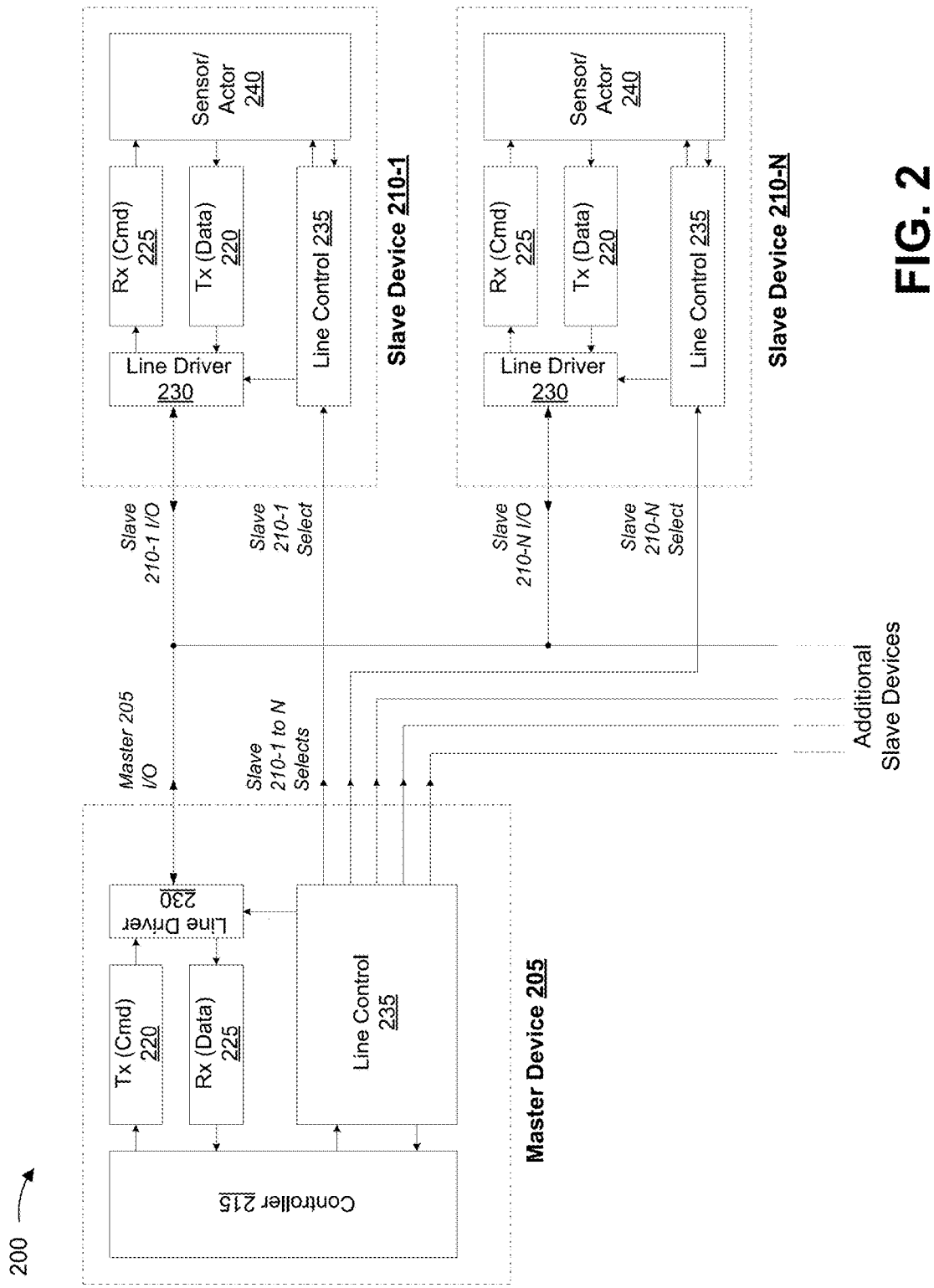
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 includes a master device 205 and a set of slave devices 210-1 through 210-N (N≥1) (herein referred to collectively as slave devices 210, and individually as slave device 210). In some implementations, master device 205 may be arranged on a same circuit board (e.g., a printed circuit board (PCB)) as one or more slave devices 210, and may be connected to the one or more slave devices 210 via on-board connections. Additionally, or alternatively, master device 205 may be arranged on a different circuit board than one or more slave devices 210. In such, a case master device 205 may be connected to the one or more slave devices 210 via a short wire connection (e.g., approximately 30 centimeters (cm), less than approximately 100 cm, less than approximately 1 meter (m)), or the like). In some implementations, master device 205 and slave device 210 may be each be implemented on a respective chip.

Master device 205 includes a device capable of communicating with and/or controlling one or more slave devices 210 to which master device 205 is connected. As shown, master device 205 includes controller 215 (e.g., a controller, a microcontroller (μC), an electronic control unit (ECU), or the like). In some implementations, controller 215 may control one or more electrical systems and/or electrical subsystems, such as one or more electrical systems and/or one or more electrical subsystems included in a motor vehicle.

As further shown, master device 205 includes a transmit (Tx) component 220 for transmitting information (e.g., synchronization information, address information, configuration information, a payload including a command and/or data, or the like) to slave devices 210 via the bi-directional, one-wire I/O line, and a receive (Rx) component 225 for receiving information (e.g., a response to a command, an acknowledgement, sensor data, readout data, or the like) from slave devices 210 via the bi-directional, one-wire I/O line.

As shown, master device 205 includes a line driver 230 for enabling Tx component 220 (to transmit information) or Rx component 225 (to receive information) at a given time (e.g., since master device 205 may not send and receive data simultaneously via the bi-directional, one-wire I/O line). As further shown, master device 205 includes a line control component 235 capable of controlling slave select lines (e.g., via which master device 205 may signal slave devices 210) and/or line driver 230. In some implementations, line control component 235 may control the slave select lines and/or line driver 230 based on information provided by controller 215. In some implementations, master device 205 may include a quantity of N+1 pins in order to implement the SCP interface (e.g., a pin for the bi-directional, one-wire I/O line and a pin for each slave select line).

Slave device 210 includes a device capable of communicating with master device 205 and being controlled by master device 205. For example, slave device 210 may include a sensing device, an actor device, a hybrid sensor/actor device, or the like. As shown, slave device 210 includes a sensor/actor 240 capable of performing a sensing function (e.g., speed sensing, angle sensing, pressure sensing, or the like) and/or performing an action (e.g., illuminating an LED, playing a sound, actuating a switch, or the like).

As further shown, slave device 210 includes a Tx component 220 for transmitting information to master device 205 via the bi-directional, one-wire I/O line, and a Rx component 225 for receiving information from master device 205 via the bi-directional, one-wire I/O line. As shown, slave device 210 includes line driver 230 for enabling Tx component 220 or Rx component 225 at a given time (e.g., since slave device 210 may not simultaneously transmit and receive information via the bi-directional, one-wire I/O line). As further shown, slave device 210 includes a line control component 235 capable of receiving a signal via a slave select line and/or controlling line driver 230. In some implementations, line control component 235 may control line driver 230 (i.e., enable receipt or transmission of information by slave device 210) based on receiving a signal via the slave select line (e.g., when master device 205 triggers slave device 210 via the slave select line) and/or based on information provided by sensor/actor 240. In some implementations, slave device 210 may include two pins in order to implement the SCP interface (e.g., a pin for the bi-directional, one-wire I/O line and a pin for the slave select line). Notably, in some implementations slave device 210 does not include a NVM component (e.g., an EEPROM, a flash memory component, or the like) or any other component associated with an individual slave addressing mechanism.

Master device 205 and slave devices 210 may support the SCP interface for communications between master device 205 and the slave devices 210. For example, as shown in FIG. 2, slave devices 210 include only two pins (e.g., a pin connected to the bi-directional, one-wire I/O line and a pin connect to the slave select line), do not include NVM components, and are arranged to directly communicate with master device 205. Additionally, or alternatively, master device 205 and/or slave device 210 may include an untrimmed oscillator capable of keeping a relatively inaccurate clock (e.g., a clock with a guaranteed accuracy of up to 20%) (not shown).

In some implementations, the SCP interface may support a single master device 205 in a bus configuration with eight or more slave devices 210. In some implementations, the SCP interface may support a single master device 205 in a bus configuration with fewer than eight slave devices 210.

The number and arrangement of devices and components shown in FIG. 2 are provided as an example. In practice, there may be additional devices and/or components, fewer devices and/or components, different devices and/or components, or differently arranged devices and/or components than those shown in FIG. 2. Furthermore, two or more devices and/or components shown in FIG. 2 may be implemented within a single device and/or a single component, or a single device and/or a single component shown in FIG. 2 may be implemented as multiple, distributed devices and/or components. Additionally, or alternatively, a set of devices (e.g., one or more devices) or a set of components (e.g., one or more components) of environment 200 may perform one or more functions described as being performed by another set of devices or another set of components of environment 200.

In some implementations, the SCP interface enables master device 205 to signal one or more slave devices 210 via one or more corresponding select lines, such that master device 205 may send information to and/or receive information from the one or more slave devices 210 via the bi-directional, one-wire I/O line. Depending on a capability and/or a configuration of slave device 210, various techniques may be implemented to enable communication via the SCP interface.

FIGS. 3A-3E are diagrams of example implementations for enabling master device 205 to communicate with slave devices 210 via the SCP interface. For the purposes of FIGS. 3A-3E, assume that master device 205 is connected to one or more slave devices 210 via an SCP interface (e.g., as shown in FIG. 2). In other words, assume that master device 205 is connected to the one or more slave devices 210 via a bi-directional, one-wire I/O line, and that master device 205 is connected to the one or more slave devices 210 via one or more corresponding select lines.

As shown in FIG. 3A, master device 205 may set a select line, associated with slave device 210, to a recessive (first) state or a dominant (second) state. Master device 205 may maintain the select line in the recessive state while master device 205 is not transmitting information to slave device 210. In some implementations, master device 205 may transition the select line from the recessive state to the dominant state. A transition of the select line from the recessive state to the dominant state signals, to slave device 210, that master device 205 will be transmitting information (e.g., synchronization information, address information, configuration information, a payload including a command and/or data, or the like) to slave device 210. Master device 205 may maintain the select line in the dominant state at least until master device finishes transmitting the information to slave device 210. Master device 205 may then transition the select line from the dominant state to the recessive state. A transition of the select line from the dominant state to the recessive state indicates, to slave device 210, that slave device 210 may transmit information (e.g., a response to the command, an acknowledgement, data, or the like) to master device 205 and/or that master device 205 has finished transmitting information to slave device 210. Here, the select line being in the dominant state indicates that slave device 210 may not transmit via the bi-directional, one-wire I/O line, while the select line being in the recessive state may indicate that slave device 210 is permitted to transmit to master device 205. In this way, a select line may be associated with controlling a direction transmission of information on the bi-directional, one-wire I/O line (e.g., from master device 205 to slave device 210 or from slave device 210 to master device 205). As described below, multiple slave devices 210 may transmit via the bi-directional, one-wire I/O line based on different response delays configured on the multiple slave devices 210 (e.g., in order to avoid collisions).

The attribute of the dominant state and the recessive state is a state or a condition on the select line that can be detected and/or differentiated for use in selection or deselection of slave device 210. In some implementations, the recessive state may correspond to a high level of a signal (e.g., a current, a voltage), while the dominant state may correspond to a low level of the signal. Here, a transition from the recessive state to the dominant state may be a transition from the high level to the low level, and a transition from the dominant state to the recessive state may be a transition from the low level to the high level.

Alternatively, the recessive state may correspond to a low level of a signal (e.g., a current, a voltage), while the dominant state may correspond to a high level of the signal. Here, a transition from the recessive state to the dominant state may be a transition from the low level to the high level, and a transition from the dominant state to the recessive state may be a transition from the high level to the low level.

Alternatively, the recessive state may correspond to a high impedance (high-Z) state of the signal (e.g., a state where the signal is not being driven to a particular level), achieved using a pull-up resistor or a pull-down resistor, while the dominant state may correspond to an active state of the signal (e.g., a state where the signal is being driven to a low level or a high level). Here, a transition from the recessive state to the dominant state may be a transition from the high-Z state to the active state, and a transition from the dominant state to the recessive state may be a transition from the active state to the high-Z state.

In some implementations, a signal on a select line and/or the bi-directional, one-wire I/O line may be pulse code modulated. Additionally, or alternatively, a signal on a select line and/or the bi-directional, one-wire I/O line may be modulated using another modulation technique, such as amplitude modulation, frequency modulation, phase modulation, phase-shift keying modulation, quadrature phase-shift keying modulation, quadrature amplitude modulation, or the like.

As shown in example implementation 300 of FIG. 3A, in some implementations, master device 205 may transition the select line, associated with slave device 210, from the recessive state to the dominant state. Here, slave device 210 may detect the transition and prepare (e.g., power-on, wake from an idle state) to receive information from master device 205. As shown, master device 205 may transmit information via the bi-directional, one-wire I/O line during the dominant state. As further shown, after master device 205 finishes transmitting the payload, master device 205 may transition the select line from the dominant state to the recessive state.

As shown in example implementation 305 of FIG. 3B, in some implementations, master device 205 may transition the select line, associated with slave device 210, from the recessive state to the dominant state. Here, slave device 210 may detect the transition and may prepare to receive information from master device 205. As shown, master device 205 may transmit, via the bi-directional, one-wire I/O line and during the dominant state, address information (e.g., information that identifies an address configured on one or more slave devices 210) followed by a payload. As further shown, after master device 205 finishes transmitting the payload, master device 205 may transition to the select line from the dominant state to the recessive state. In some implementations, when the address information includes an address that is not configured on slave device 210, slave device 210 may ignore the payload, as described below.

As shown in example implementation 310 of FIG. 3C, in some implementations, master device 205 may transition the select line, associated with slave device 210, from the recessive state to the dominant state. Here, slave device 210 may detect the transition and may prepare to receive information from master device 205. As shown, master device 205 may transmit, via the bi-directional, one-wire I/O line and during the dominant state, synchronization information (e.g., information that may be used to synchronization bit rates between master device 205 and slave device 210) followed by a payload. As further shown, after master device 205 finishes transmitting the payload, master device 205 may transition to the select line from the dominant state to the recessive state.

As shown in example implementation 315 of FIG. 3D, in some implementations, master device 205 may transition the select line, associated with slave device 210, from the recessive state to the dominant state. Here, slave device 210 may detect the transition and may prepare to receive information from master device 205. As shown, master device 205 may transmit, via the bi-directional, one-wire I/O line and during the dominant state, synchronization information, address information, and a payload. As further shown, after master device 205 finishes transmitting the payload, master device 205 may transition to the select line from the dominant state to the recessive state.

Figure 3E:
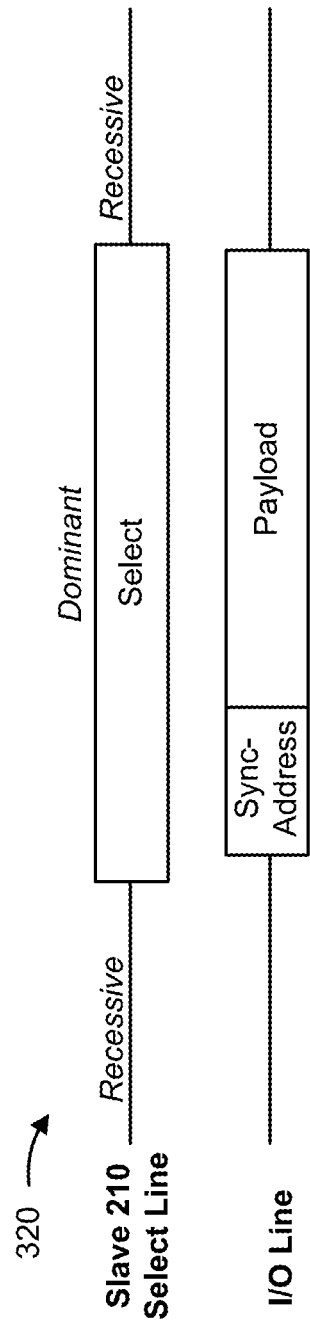

As shown in example implementation 320 of FIG. 3E, in some implementations, master device 205 may transition the select line, associated with slave device 210, from the recessive state to the dominant state. Here, slave device 210 may detect the transition and may prepare to receive information from master device 205. As shown, master device 205 may transmit, via the bi-directional, one-wire I/O line and during the dominant state, synchronization-address information (e.g., combined synchronization information and address information) followed by a payload. As further shown, after master device 205 finishes transmitting the payload, master device 205 may transition to the select line from the dominant state to the recessive state.

The example implementations of FIGS. 3A and 3B do not include synchronization information associated with synchronizing bit rates between master device 205 and slave device 210. As such, these example implementations may be implemented when bit rates of master device 205 and slave device 210 are already synchronized (e.g., when a previous transmission included synchronization information), are configured with accurate clocks such that synchronization information is unnecessary, or operate based on a same clock signal.

In some implementations, the example implementations shown in FIGS. 3A and 3C may be implemented to allow master device 205 to configure slave device 210 with an address. For example, master device 205 may set a select line for a single slave device 210 to the dominant state, and may provide, via the bi-directional, one-wire I/O line, information associated with an address to be assigned to slave device 210. Here, other slave devices 210 may ignore the transmission (e.g., since master device 205 transitions only the select line associated with the single slave device 210), thereby allowing slave device 210 to be configured with the address. The other slave devices 210 may be configured with addresses in a similar manner. In some implementations, slave device 210 may be configured with one or more addresses. Additionally, or alternatively, master device 205 may configure multiple slave devices 210 with a same (i.e., shared) address.

In some implementations, the example implementations shown in FIGS. 3B, 3D, and 3E may be implemented to allow master device 205 to concurrently transmit information to multiple slave devices 210. For example, in a case where master device 205 is configured to set or maintain all select lines to the dominant state (e.g., in order to reduce processing and/or configuration on master device 205), a subset of slave devices 210 may be configured with a shared address (e.g., in the manner described above). Here, master device 205 may provide address information identifying the shared address, and a payload via the bi-directional, one-wire I/O line. In this example, slave devices 210 configured with the shared address may act based on the information included in the payload, while slave devices 210 that are not configured with the shared address may ignore the payload.

In some implementations, the example implementations shown in FIGS. 3B, 3D, and 3E may be implemented for a slave device 210 that is configured with an address, as described above, or for a slave device 210 that includes a NVM component (e.g., that stores an address that is known to master device 205) or another component associated with an individual slave addressing mechanism.

Using one or more of the above techniques, master device 205 may efficiently communicate with slave devices 210 via the SCP interface. For example, master device 205 may concurrently transmit information to multiple slave devices 210. In such a case, master device 205 may concurrently signal, via select lines corresponding to each of multiple slave devices 210, that master device 205 is to transmit, and each slave device 210 may detect the signal (sometimes referred to as a common trigger signal). Here, the multiple slave devices 210 may act (e.g., perform a sensing function, provide data to master device 205, illuminate an LED, set a configuration parameter, etc.) based on the information included in the payload received after detecting the signal. In some implementations, collisions may be prevented among responses provided by multiple slave devices 210 based on response delays configured on each slave device 210, an example of which is described below.

As indicated above, FIGS. 3A-3E are provided merely as examples. Other examples are possible and may differ from what was described with regard to FIGS. 3A-3E.

In some implementations, signaling to slave device 210 via transitions on the select line (sometimes referred to as slave triggering) may be achieved using a falling edge of the signal, a rising edge of the signal, a particular pattern of rising and falling edges, or the like. In some implementations, the SCP interface may support a slave triggering capability that allows master device 205 to simultaneously trigger and transmit to multiple slave devices 210 (e.g., such that multiple sensors perform a sensing function, such that multiple actors perform an action).

In some implementations, the SCP interface allows slave device 210 to signal an exception to master device 205. For example, slave device 210 may detect the exception associated with slave device 210 (e.g., an error, an overtemperature condition, or the like). Here, slave device 210 may be configured to determine whether the select line, associated with slave device 210, is in the recessive state and, if so, may set the select line to the dominant state. In this example, master device 205 may detect the transition of the select line initiated by slave device 210, and may transmit a command (e.g., a request for information associated with the exception) from slave device 210.

As another example, slave device 210 may detect the exception, and may be configured to determine whether the bi-directional, one-wire I/O line is available (e.g., whether master device 205 is transmitting information or whether another slave device 210 is transmitting information to master device 205) and, if so, may transmit information associated with the exception to master device 205 via the bi-directional, one-wire I/O line.

Figure 4:
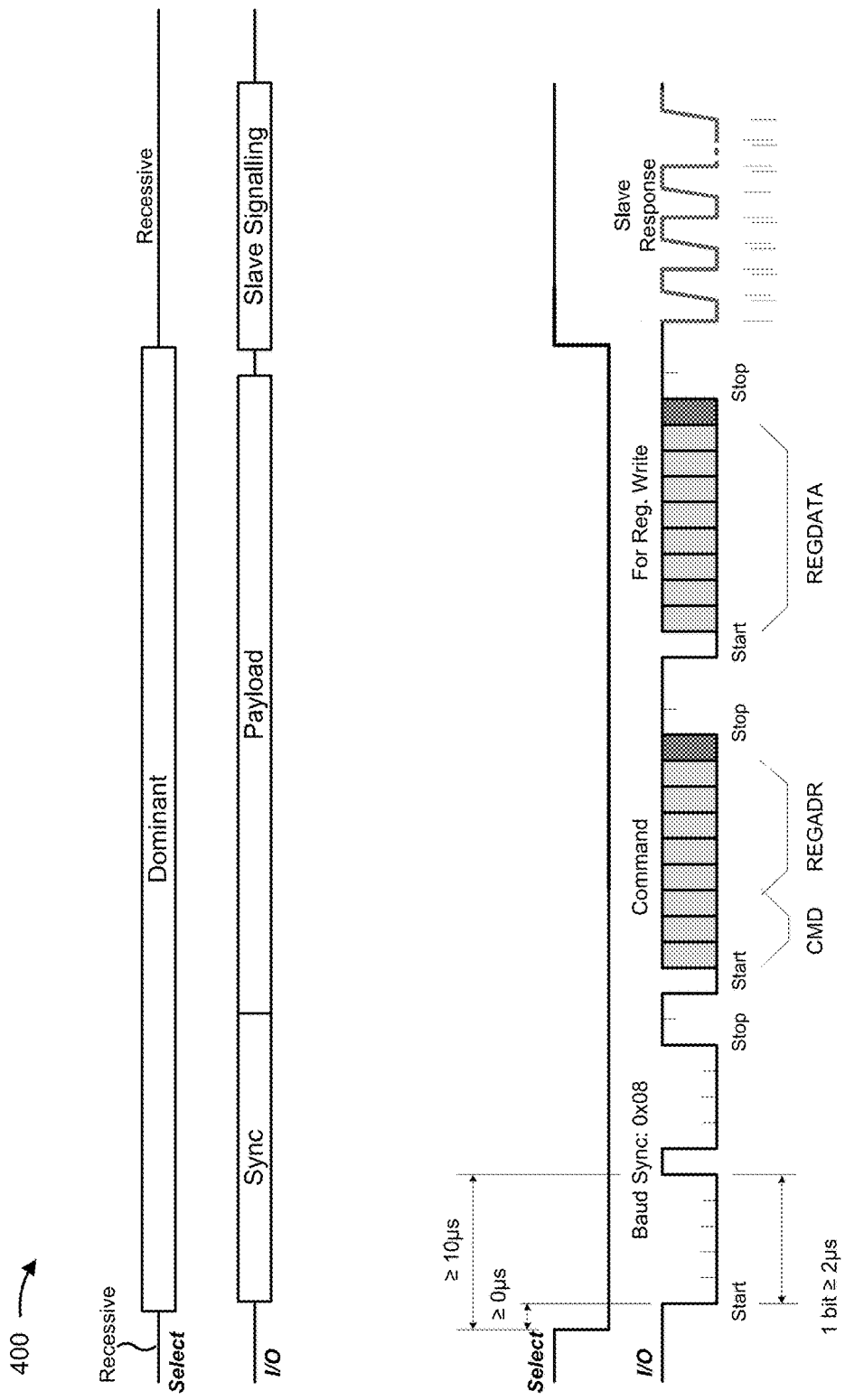
FIG. 4 is a diagram of a particular example using the example implementation associated with FIG. 3C for enabling communication via the SCP interface.

FIG. 4 is a diagram of a particular example of using example implementation 310 (FIG. 3C) for enabling communication via the SCP interface. The upper portion of FIG. 4 generically identifies activity on a select line, associated with a particular slave device 210, and activity on the bi-directional, one-wire I/O line, while the lower portion of FIG. 4 illustrates example details of the activity on the select line and the bi-directional, one-wire I/O line.

As shown in the upper portion of FIG. 4, the select line starts in a recessive state. The recessive state of the select line corresponds to a high signal level of the select line in the lower portion of FIG. 4. As further shown, when master device 205 is to provide information (e.g., synchronization information, a payload including a write command and write data) to slave device 210, master device 205 may set the select line to a dominant state. The transition to the dominant state is identified as a falling edge of the select line signal in the lower portion of FIG. 4.

As further shown in the upper portion of FIG. 4, after setting the select line to the dominant state, master device 205 may transmit the synchronization information via the bi-directional, one-wire I/O line. The transmission of the synchronization information is identified on the bi-directional, one-wire I/O line as a first set of 10 bits. Here, a first sequence of bits of the synchronization information (e.g., the first six bits, including a start bit at the low signal level, a first set of four bits at the low signal level, and an intermediate bit at the high signal level) may allow slave device 210 ample time to power-up, wake from idle, power on or wake up a component, or the like. A second sequence of bits of the synchronization information (e.g., a second set of four bits at the low signal level (including a parity bit), and a stop bit at the high signal level) may allow slave device 210 to determine a baud rate (e.g., in bits per second) at which master device 205 transmits information. Here, slave device 210 may measure an amount of time corresponding to the second set of four bits (e.g., an amount of time that the signal was at the low level during receipt of the second sequence of bits), and may determine the baud rate based on the amount of time divided by four (i.e., the number of bits in the second set). Slave device 210 may use the baud rate to synchronize with master device 205 (e.g., such that slave device 210 may accurately decode the payload).

In some implementations, slave device 210 may also measure an amount of time corresponding to the intermediate bit in the first sequence (e.g., an amount of time that the signal was at the high level during the first sequence of bits). This may be useful to verify synchronization in a case where an open-drain configuration on slave device 210 causes a low-to-high transition on the bi-directional, one-wire I/O line to be slower (i.e., take a longer amount of time) than a high-to-low transition on the bi-directional, one-wire I/O line when slave device 210 transmits data to master device 205 after executing a command.

In this way, master device 205 may provide synchronization information that allows for transmission of information in a case where slave device 210 and/or master device 205 operate based on a low-cost clock (e.g., a clock with a guaranteed accuracy of up to 20%). Here, an accurate clock is not needed since synchronization information is provided by master device 205 to slave device 210.

As further shown in the upper portion of FIG. 4, while the select line remains in the dominant state, master device 205 may provide a payload to slave device 210. As shown in the corresponding lower portion of FIG. 4, a first sequence of bits of the payload may include information associated with a command that slave device 210 is to execute (e.g., a command to perform a write operation, identified by the bits labeled with CMD, and information that identifies an address of a registry associated with the write operation, identified by the bits labeled REGADR), and a second sequence of bits may include information associated with the command to be executed (e.g., data to be written to the registry, identified by the bits labeled REGDATA).

As further shown in the lower portion of FIG. 4, master device 205 may transition the select line back to the high level after transmitting the payload (e.g., immediately after, after waiting for a configurable amount of time).

In an alternative implementation, master device 205 may transition the select line to the high level after transmitting the first set of payload bits and before transmitting the second set of payload bits. In such a case, slave device 210 may be configured (e.g., by master device 205) with a response delay that causes slave device 210 to wait a particular amount of time after the transition of the select line to the recessive state before transmitting information to master device 205 (e.g., in order to allow master device 205 to provide the second set of payload bits before slave device 210 responds to master device 205).

As further shown, after master device 205 transitions the select line to the recessive level (e.g., immediately after, based on a response delay configured on slave device 210), slave device 210 may transmit information (e.g., an acknowledgment) to master device 205. In this way, the SCP interface may enable asynchronous communication via the bi-directional, one-wire I/O line. As shown, in an implementation where an open-drain configuration on slave device 210 that causes a low-to-high transition to be slower than a high-to-low transition, slave device 210 transmits such that synchronization may be achieved (e.g., by starting a high-to-low transition earlier to accommodate for the increased transition time).

As indicated above, FIG. 4 is provided merely as an example. Other examples are possible and may differ from what was described with regard to FIG. 4. For example, while FIG. 4 is an implementation of the SCP interface that uses UART-based transmissions, implementations are possible, such as a SPC-based transmissions, PSI5-based transmissions, or another type of transmission associated with a single-wire interface. In some implementations, the SCP interface may even utilize an M-wire (M>1) interface, such as an I2C interface.

Figure 5B:
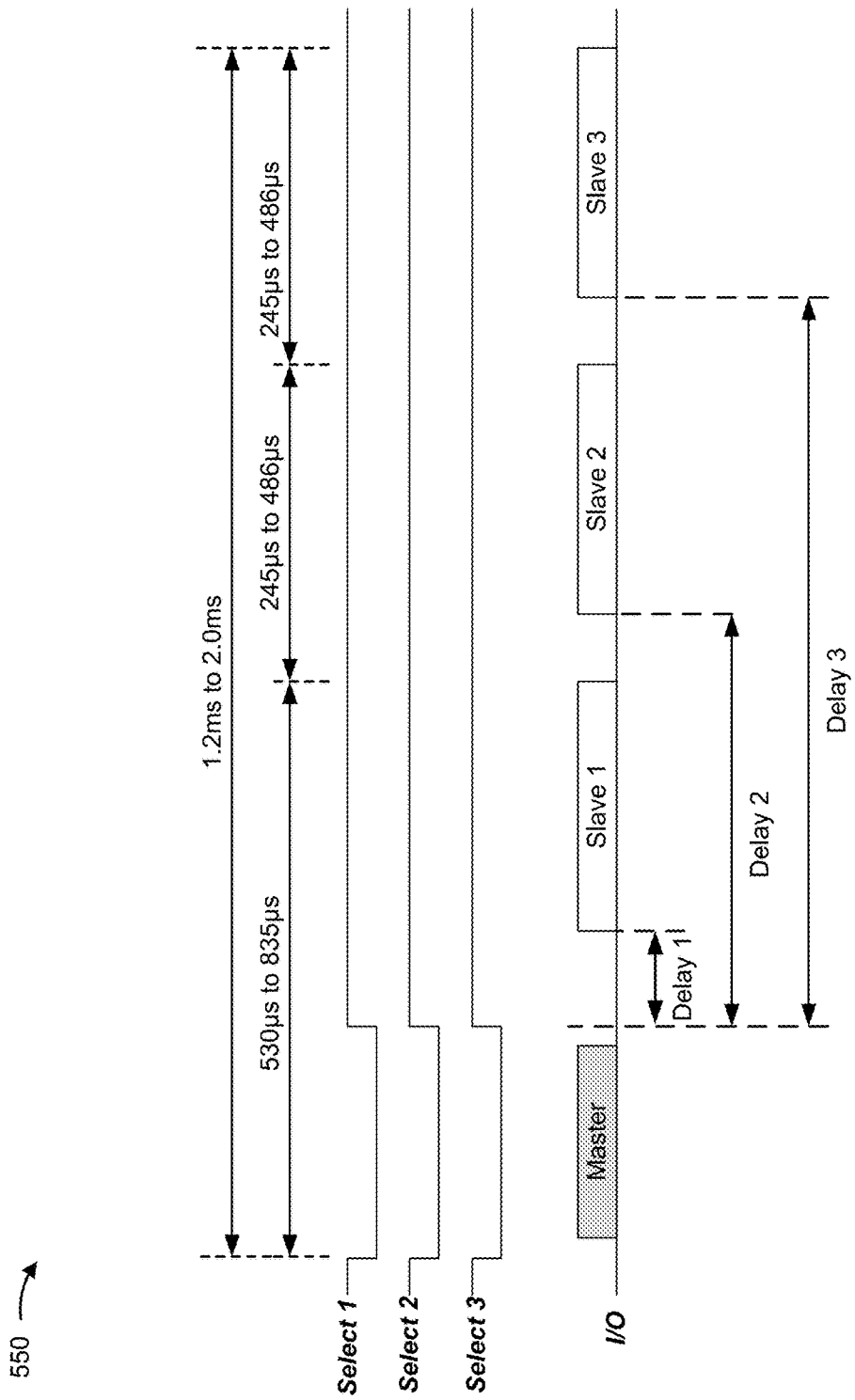

FIGS. 5A and 5B are diagrams of additional example implementations 500 and 550 associated with implementing the SCP interface for communications between master device 205 and one or more slave devices 210. For the purposes of FIGS. 5A and 5B assume that master device 205 is connected to multiple slave devices 210 (e.g., slave device 210-1, slave device 210-2, and slave device 210-3) via an SCP interface.

FIG. 5A is diagram of an example implementation 500 of master device 205 selecting a single slave device 210 via a corresponding select line, and communicating with the single slave device 210 accordingly. As shown in FIG. 5A, master device 205 may set a signal on a first select line, associated with a first slave device 210 (e.g., select 1 associated with slave device 210-1), to a low level (i.e., a transition from a high level to the low level) in order to signal to the first slave device 210 to prepare to receive information from master device 205. As further shown, based on setting the first select line to the low level, master device 205 may transmit information (e.g., a payload, synchronization information, configuration information associated with configuring an address or a response delay on the first slave device 210, or the like) via the bi-directional, one-wire I/O line. Here, the first slave device 210 may receive the information and act accordingly.

Notably, a second slave device 210 (e.g., slave device 210-2) and a third slave device 210 (e.g., slave device 210-3) do not act based on the information transmitted by master device 205 since master device 205 maintains a second select line, associated with the second slave device 210, and a third select line, associated with the third slave device 210, at the high level.

As further shown, after master device 205 transmits the information on the bi-directional, one-wire I/O line, master device 205 may set the signal on the first select line to the high level (i.e., a transition from the low level to the high level). As further shown, after master device 205 sets the signal on the first select line to the high level (e.g., after a first response delay configured on the first slave device 210), the first slave device 210 may transmit information (e.g., an acknowledgement, data requested by master device 205) to master device 205 via the bi-directional, one-wire I/O line. As shown, an amount of time from selection of the first slave device 210 to an end of transmission by the first slave device 210 may be in a range from approximately 530 microseconds to approximately 835 microseconds.

FIG. 5B is diagram of an example implementation 550 of master device 205 selecting multiple slave devices 210 via corresponding select lines, and communicating with the multiple slave device 210 accordingly. As shown in FIG. 5B, master device 205 may set a signal on a first select line associated with a first slave device 210 (e.g., select 1 associated with slave device 210-1), a signal on a second select line associated with a second slave device 210 (e.g., select 2 associated with slave device 210-2), and a signal on a third select line associated with a third slave device 210 (e.g., select 3 associated with slave device 210-3) to a low level in order to simultaneously signal to the multiple slave devices 210 to prepare to receive information from master device 205. As further shown, based on setting the first, second, and third select lines to the low level, master device 205 may transmit information on the bi-directional, one-wire I/O line. Here, each of the first, second, and third slave devices 210 may receive the information and act accordingly.

As further shown, after master device 205 transmits the information on the bi-directional, one-wire I/O line, master device 205 may set the signals on the first, second, and third select lines to the high level. As further shown, after master device 205 sets the signals on the first, second, and third select lines to the high level, the slave devices 210 may transmit information to master device 205 via the bi-directional, one-wire I/O line. As shown, the first slave device 210 may transmit after an amount of time corresponding a first response delay (e.g., labeled as delay 1), the second slave device 210 may transmit after an amount of time corresponding a second response delay (e.g., labeled as delay 2), and the third slave device 210 may transmit after an amount of time corresponding a third response delay (e.g., labeled as delay 3). In this way, response may be time-division multiplexed such that collisions on the bi-directional, one-wire I/O line are avoided, while permitting master device 205 to efficiently communicate with multiple slave devices 210 (e.g., since master device 205 need only transmit information once), thereby allowing master device 205 to reduce an amount of time needed to communicate with multiple slave devices 210. As shown, an amount of time from selection of the multiple slave devices 210 to an end of transmission by the third slave device 210 may be in a range from approximately 1.2 milliseconds (ms) to approximately 2.0 ms.

As indicated above, FIGS. 5A and 5B are provided merely as examples. Other examples are possible and may differ from what was described with regard to FIGS. 5A and 5B.

Figure 6A:
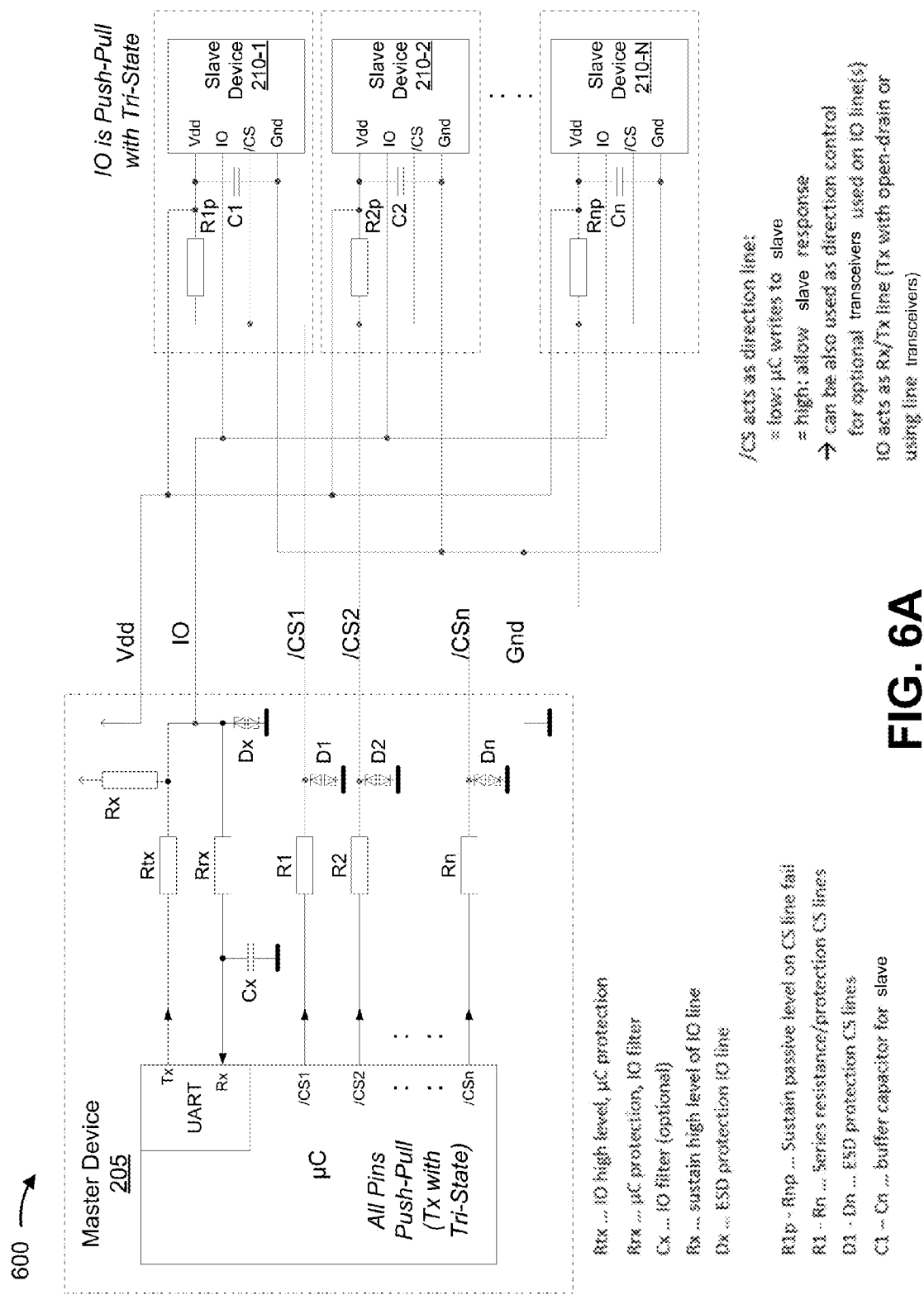
FIGS. 6A and 6B are diagrams of example arrangements of electrical elements that may enable the SCP interface between a master device and one or more slave devices.
Figure 6B:
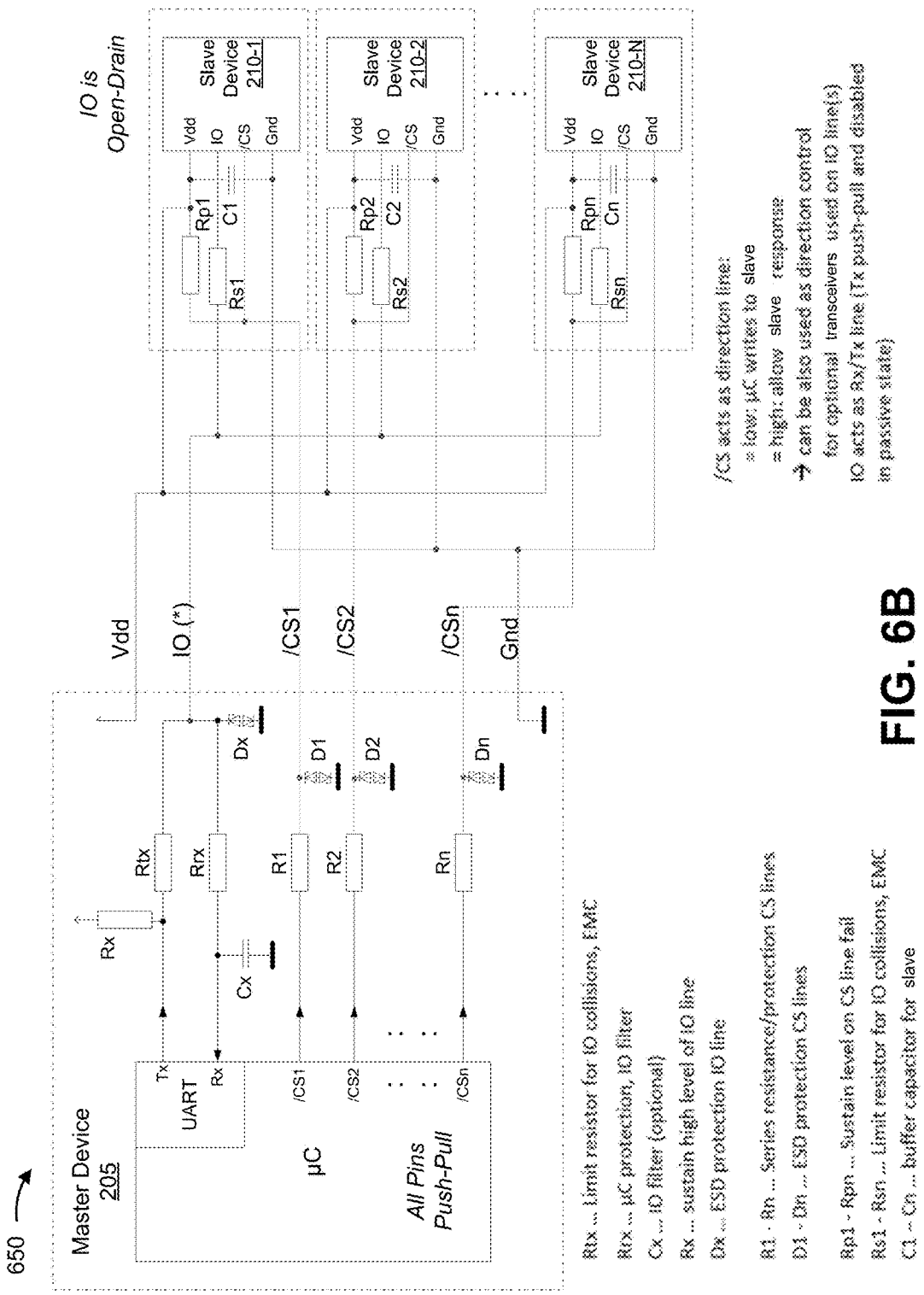

FIGS. 6A and 6B are diagrams of example arrangements 600 and 650 of electrical elements that may enable the SCP interface between master device 205 and slave devices 210.

FIG. 6A shows example arrangement 600 that uses an open-drain interface on a slave device 210 side for a connection with the bi-directional, one-wire I/O line, and a push-pull output on a master device 205 side for a connection with the bi-directional, one-wire I/O line. Here, the push-pull output on the master device 205 side is connected over a series resistance (e.g., acting to pull up the level of the signal when master device 205 is not transmitting). Thus, a slave device 210 may pull down the level of the signal on the bi-directional, one-wire I/O line (which may be detected by master device 205) in a case where slave device 210 needs to transmit information (e.g., signal an exception) to master device 205. This allows example arrangement 600 to inherently protect against collisions between transmissions by slave devices 210.

As further shown in FIG. 6A, the select lines (e.g., labeled /CS1, /CS2, and /CSN in FIG. 6A) are implemented as individual lines for each slave device, thereby allowing master device 205 to signal each slave device 210 individually or signal multiple slave devices 210 in parallel.

FIG. 6B shows example arrangement 650 that uses push-pull outputs on the master device 205 side and the slave device 210 side. Here, the push-pull outputs can be set to an inactive state, and other means of protection from collisions may be implemented. For example, as shown in example arrangement 650, small series resistors (e.g., external or on-chip) may be used in order to limit current flow in order to protect against collisions. One possible advantage of example arrangement 650 is that such an arrangement provides for robust signal generation and data readout (e.g., since both rising and falling signal edges are actively controlled), thereby providing electromagnetic capability robustness.

The number and arrangement of elements shown in FIGS. 6A and 6B are provided as examples. In practice, there may be additional elements, fewer elements, different elements, or differently arranged elements than those shown in FIGS. 6A and 6B. Furthermore, two or more elements shown in FIGS. 6A and 6B may be implemented within a single element, or a single element shown in FIGS. 6A and 6B may be implemented as multiple, distributed elements. Additionally, or alternatively, a set of elements (e.g., one or more elements) of FIGS. 6A and 6B may perform one or more functions described as being performed by another set of elements of FIGS. 6A and 6B.

Implementations described herein provide a bus interface with a bi-directional, one-wire communication line between a master device and a set of slave devices, with an individual select line for each slave device. This bus interface may be referred to as a serial companion (SCP) interface.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related items, and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:
1. A system, comprising:
a plurality of slave devices connected to a master device via a bus interface that includes a communication line and a plurality of select lines,
where the communication line connects the master device to each of the plurality of slave devices and permits bi-directional, one-wire communication among the master device and the plurality of slave devices,
where a select line, of the plurality of select lines, connects the master device to a slave device, of the plurality of slave devices, and enables signaling, associated with the bi-directional, one-wire communication, between the master device and the slave device, and
where the slave device is to:
receive synchronization information from the master device via the communication line;
determine a baud rate at which the master device transmits information based on a second sequence of bits of the synchronization information;
use the baud rate to synchronize with the master device;
determine an amount of time based on a first sequence of bits of the synchronization information; and
verify synchronization based on the amount of time.

2. The system of claim 1, where the slave device, of the plurality of slave devices, includes only two pins.

3. The system of claim 1, where the master device includes a quantity of pins equal to a quantity of the plurality of slave devices plus one.

4. The system of claim 1, where the slave device, of the plurality of slave devices, does not include a non-volatile memory or another component associated with an individual slave addressing mechanism.

5. The system of claim 1, where the master device and the slave device are connected via a wired connection that is less than or equal to one meter in length.

6. The system of claim 1, where the bi-directional, one-wire communication among the master device and the plurality of slave devices is asynchronous.

7. The system of claim 1, where the select line is associated with controlling a direction transmission of information on the communication line.

8. A system, comprising:
a master device to:
signal, via a select line associated with a slave device, that the master device is to transmit information via a communication line,
where the master device is connected to the slave device via a bus interface that includes the communication line and the select line,
where the communication line permits bi-directional, one-wire communication between the master device and the slave device, and
where the select line enables signaling by the master device to be detected by the slave device; and
transmit, based on signaling via the select line, the information on the communication line; and
the slave device to:
detect the signaling on the select line;
receive the information, from the master device and via the communication line, based on detecting the signaling on the select line,
the information including synchronization information;
determine a baud rate at which the master device transmits based on a second sequence of bits of the synchronization information;
use the baud rate to synchronize with the master device;
determine an amount of time based on a first sequence of bits of the synchronization information; and
verify synchronization based on the amount of time.

9. The system of claim 8, where the information further includes at least one of:
address information that identifies an address of the slave device,
configuration information associated with configuring the slave device, or
a payload that includes information associated with a command to be executed by the slave device.

10. The system of claim 8, where the slave device, after receiving the information, is to transmit a response to the master device via the communication line.

11. The system of claim 8, where the master device, when signaling via the select line, is to:
cause a level of a signal, associated with the select line, to transition from a first state to a second state,
the first state being different from the second state.

12. The system of claim 11, where the master device, when causing the level of the signal to transition from the first state to the second state, is to:
transition the signal level from a low level to a high level,
transition the signal from a high level to a low level, or
transition the signal from a high impedance state to an active state.

13. The system of claim 11, where the master device is to transmit the information while the level of the signal is in the second state.

14. The system of claim 11, where the master device, after transmitting at least a portion of the information, is further to:
cause the level of the signal, associated with the select line, to transition from the second state to the first state.

15. The system of claim 8, where the slave device is further to:
protect against a collision when transmitting to the master device via the communication line.

16. The system of claim 15,
where the slave device is further to:
pull down a level of a signal, associated with the communication line,
where the master device includes a push-pull output that pulls up the level of the signal when the master device is not transmitting information via the communication line, and
where the slave device, when protecting against the collision, is to:
protect against the collision based on pulling down the level of the signal associated with the communication line.

17. The system of claim 15,
where the slave device is further to:
limit an amount of current flow, associated with the communication line, using a set of resistors of the slave device,
where the master device and the slave device include push-pull outputs set to an inactive state; and
where the slave device, when protecting against the collision, is to:
protect against the collision based on limiting the amount of current flow associated with the communication line.

18. The system of claim 8, where the master device, when signaling that the master device is to transmit, is further to:
concurrently signal, via a plurality of select lines corresponding to each of a plurality of slave devices, that the master device is to transmit,
the plurality of select lines including the select line, and the plurality of slave devices including the slave device.

19. The system of claim 18, where the master device, when transmitting the information on the communication line and based on concurrently signaling to the plurality of slave devices, is to:
transmit information that causes each slave device, of the plurality of slave devices, to perform a respective sensing function.

20. The system of claim 8, where the master device, when transmitting the information on the communication line, is to:
transmit information that causes a plurality of slave devices to transmit sensor data to the master device based on a corresponding plurality of response delays, the plurality of slave devices including the slave device.

21. A system, comprising:
a set of slave devices;
a master device;
a bi-directional, one-wire communication bus connecting the master device and the set of slave devices; and
a set of select lines connecting the master device and the set of slave devices,
each select line, of the set of select lines, connecting the master device to a respective slave device of the set of slave devices, and
a slave device, of the slave devices, being to:
receive synchronization information from the master device via the bi-directional, one-wire communication bus;
determine a baud rate at which the master device transmits information based on a second sequence of bits of the synchronization information;
use the baud rate to synchronize with the master device;
determine an amount of time based on a first sequence of bits of the synchronization information; and
verify synchronization based on the amount of time.

22. The system of claim 21, where each of the set of slave devices includes only two pins each for communication.

23. The system of claim 21, where the master device and one or more of the set of slave devices are implemented on a same circuit board.

24. The system of claim 21, where the set of slave devices includes one or more sensors, one or more actors, or one or more hybrid sensor/actors.

* * * * *